United States Patent

[11] 3,608,758

| [72] | Inventor | Donald S. Dolbin |
| | | 1424 Cutright St., Chillicothe, Ill. 61523 |
| [21] | Appl. No. | 2,884 |
| [22] | Filed | Jan. 14, 1970 |
| [45] | Patented | Sept. 28, 1971 |

[54] BOAT LOADING AND CARRYING DEVICE FOR VEHICLE TOP
10 Claims, 10 Drawing Figs.

| [52] | U.S. Cl. | 214/450 |
| [51] | Int. Cl. | B60r 9/00 |
| [50] | Field of Search | 214/450, 83.24 |

[56] References Cited
UNITED STATES PATENTS
| 2,834,491 | 5/1958 | Wells | 214/450 |
| 3,363,788 | 1/1968 | Grosclaude | 214/450 |

Primary Examiner—Gerald M. Forlenza
Assistant Examiner—John Mannix
Attorney—Polachek & Saulsbury ABSTRACT: A boat loading and carrying device comprises an assembly of front and rear racks attachable to the roof of a vehicle. The front rack includes a stationary rail attached transversely of the roof, and a movable rail engaged with the first rail by a pin. The pin has a key engaged in a longitudinal slot in the first rail to permit the pin and second rail to slide along the first rail when the second rail is perpendicular to the first rail. A hole at the center of the slot permits the movable rail and pin to rotate with respect to the first rail. The narrow slot engages the wider pin to prevent the pin and second rail from sliding along the first rail when the second rail is disposed parallel to the first rail. Straps attached to opposite ends of the front and rear racks hold the boat in place on the device.

PATENTED SEP28 1971

INVENTOR.
DONALD S. DOLBIN
BY
Polachek & Saulsbury
ATTORNEYS

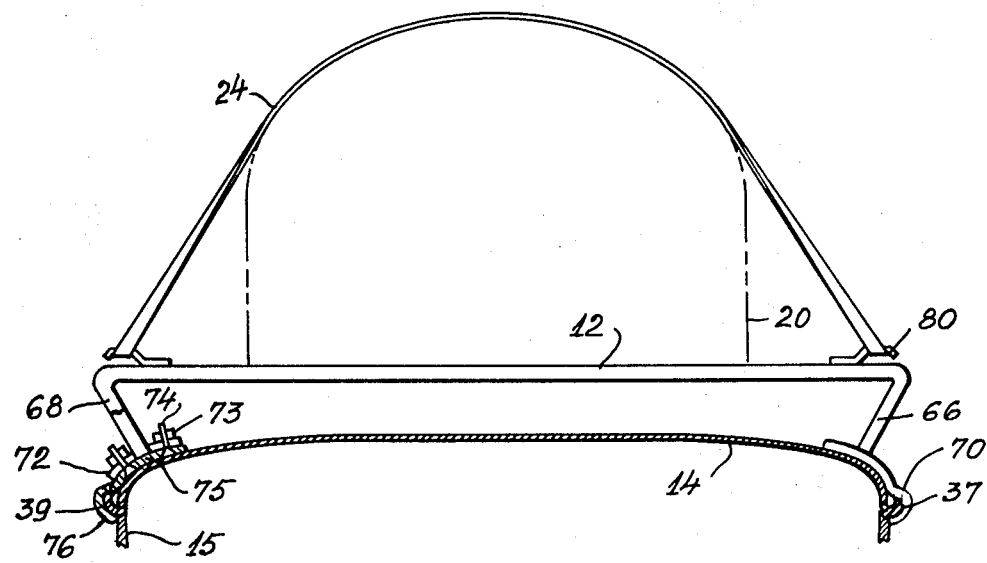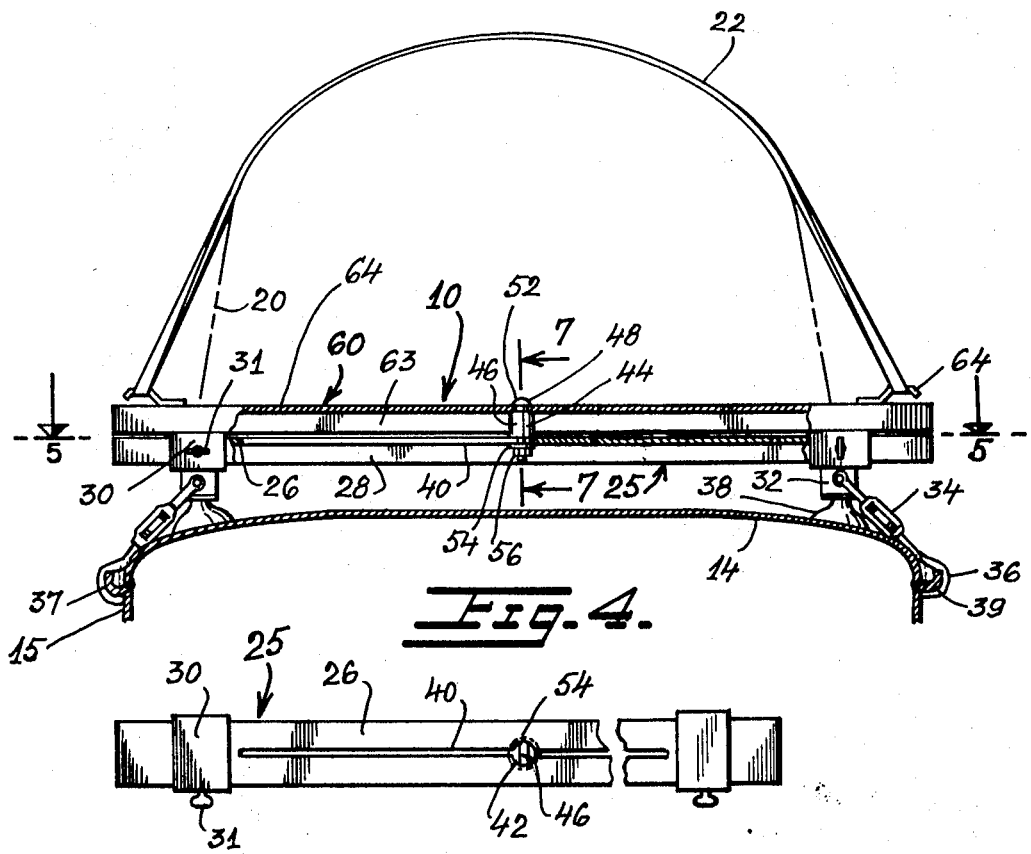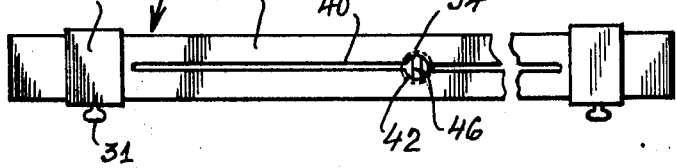

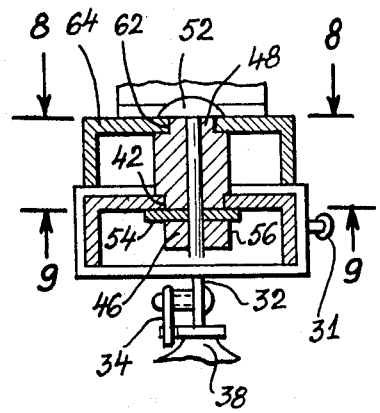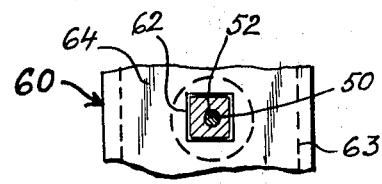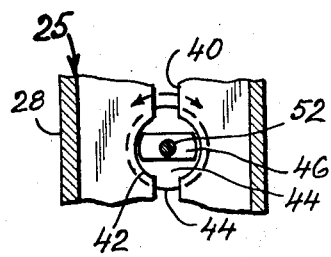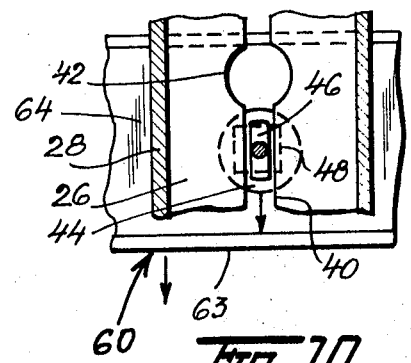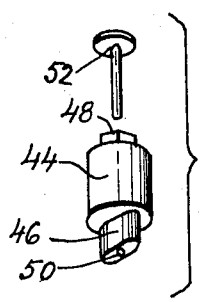

BOAT LOADING AND CARRYING DEVICE FOR VEHICLE TOP

The invention concerns a boat loading and carrying device by means of which a small boat or skiff can be quickly and safely loaded and carried on the top of a vehicle, and can be easily unloaded.

Heretofore, boat loading carriers for vehicle tops have generally included two stationary, transverse racks provided with straps to which a boat is attached. This type of carrier has the disadvantage that it is difficult to load the boat on the racks. To load the boat on the racks it must be placed on one rack in a direction parallel to the rack and then it must be swung around to mount on the other rack. This operation is difficult because the boat is not properly supported while it is being placed on the first rack and while it is being swung around to the second rack. Recognizing this difficulty, it has been proposed heretofore to provide a vehicle with a rotatable rack. Such a construction is typically described in U.S. Pat. No. 2,600,082. This type of rack has the disadvantage that it is complicated in structure and expensive to manufacture. Furthermore, it extends over the full length of the vehicle top, which is undesirable. A further disadvantage is that it cannot be accommodated to boats and vehicles of different lengths; also it cannot be used as a luggage carrier of general utility.

The present invention is directed at overcoming the above and other difficulties and disadvantages of prior boat loaders and carriers for vehicle tops by providing boat loader and carrier of a simplified construction which has none of the objections mentioned above.

According to the invention, the boat loader and carrier employs two racks, a front rack and a rear rack. The front rack comprises a fixed cross rail and a movable cross rail rotatably and slidably engaged on the fixed rail. The movable cross rail rotates and slides with a pin having a key engaged in a slot in the fixed rail. The key rotates in a hole in the center of the fixed rail. In loading a boat on the loader and carrier, the movable rail is initially rotated with the pin to a position perpendicular to the fixed rail and is then strapped to the movable rail. The boat and movable rail can then slide along the fixed rail transversely of the vehicle. When the pin and movable rail are centered on the fixed rail with both rails mutually perpendicular, the boat and slidable rail are turned with the pin until the boat is disposed longitudinally on top of the vehicle with both rails parallel to each other transversely of the vehicle top. The stern end of the boat is then placed on the rear stationary rack and is strapped thereto. The key of the pin is oriented parallel to the slot in the fixed rail so that the boat cannot become displaced while being carried.

The invention is explained in further detail below in connection with the drawings, wherein:

FIG. 3 and FIG. 4 are elevational views partially in section of both racks taken on lines 3—3 and 4—4 respectively of FIG. 2.

FIG. 5 is a horizontal sectional view taken on line 5—5 of FIG. 4, parts being broken away.

FIG. 6 is an enlarged exploded perspective view of the turning pin and bolt.

FIG. 7 is an enlarged fragmentary sectional view taken on line 7—7 of FIG. 4.

FIGS. 8 and 9 are fragmentary top and bottom horizontal sectional views taken on lines 8—8 and 9—9 respectively of FIG. 7.

FIG. 10 is a view similar to FIG. 9 showing the movable rail and pin sliding along the slot in the fixed rail during the process of loading or unloading the boat.

Figure 1:
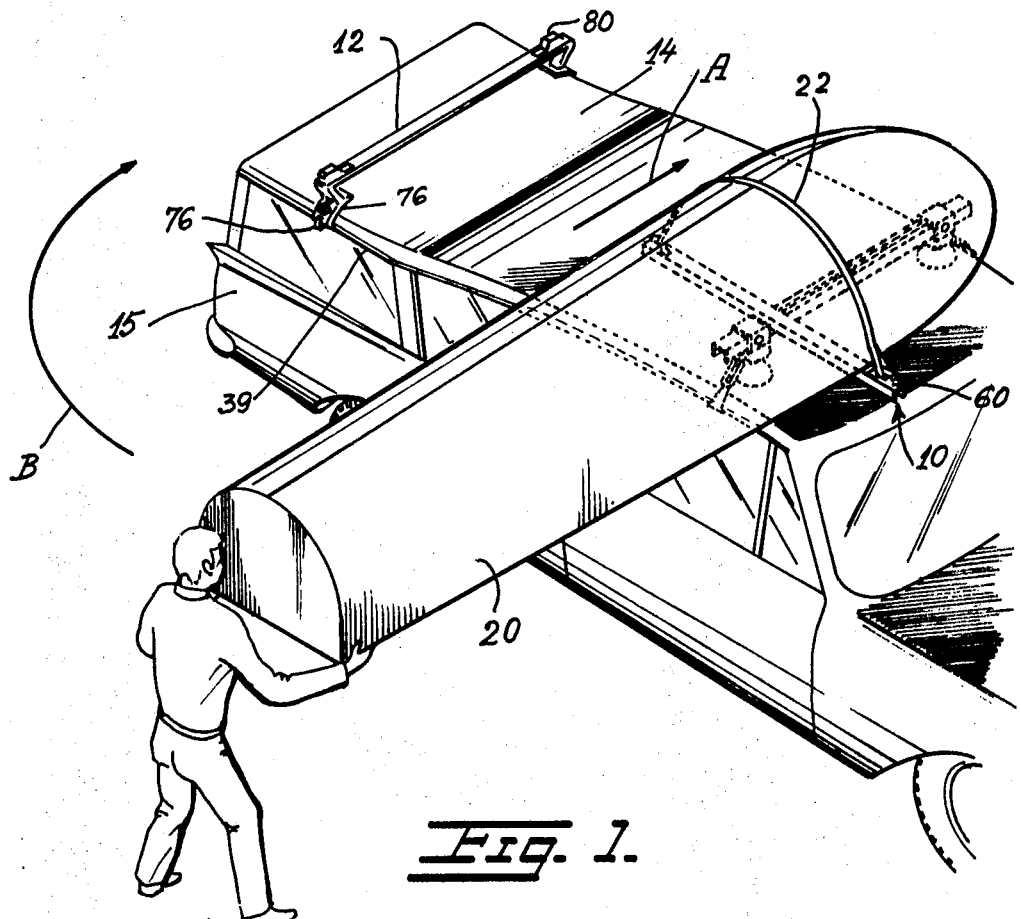
FIG. 1 is a perspective view of a boat loader and carrier embodying the invention shown installed on a vehicle top, with a small boat shown in the process of loading.
Figure 2:
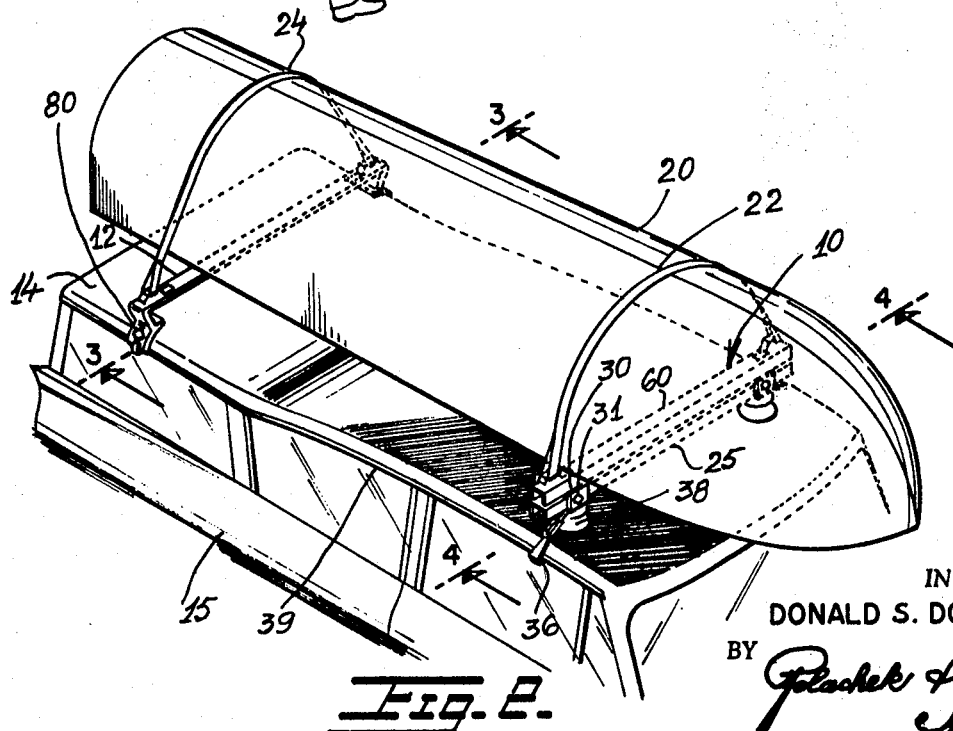
FIG. 2 is a view similar to FIG. 1, with boat shown mounted on the boat loader and carrier.

Referring first to FIGS. 1–4, there is shown a boat loader and carrier comprising a front rack 10 and a rear rack 12 mounted on the roof 14 of an automotive vehicle 15. A boat 20 is shown in FIG. 1 being loaded on the vehicle in FIG. 1, and in FIG. 2 the boat is mounted in place and held by front strap 22 and rear strap 24 engaged on the respective racks.

Front rack 10 as shown to best advantage in FIGS. 2 and 4–10 includes a lower stationary rail 25. This is a channel shaped bar with flat flange 26 uppermost and lateral flanges 28 disposed vertically so the channel is open at the bottom. Adjustably engaged on rail 25 are two rectangular clamps 30 provided with thumb screws 31 for holding the rail in place transversely of roof 14. The clamps have depending flanges 32 on which are engaged turnbuckles 34. The turnbuckles terminate in hooks 36 which engage turned up free edges 37, 39 of the roof 14; see FIG. 4. Rubber suction cups 38 secured to flanges 32 bear on the top of the roof and support the rack.

The top flange 26 of rail 25 is formed in a longitudinally extending slot 40. A round hole 42 is formed at the center of the slot in flange 26. A cylindrical pin 44 is provided with a flat key 46 extending radially and rotatably disposed in hole 42; see FIGS. 4,5,6,7 and 9. The pin has a rectangular head 48 best shown in FIGS. 6,7 and 8. The pin also has an axial bore 50 through which extends the shank of a bolt 52. The free threaded end of the bolt receives a washer 54 and nut 56. The washer bears against the underside of flange 26 with the nut under the washer; see FIG. 7.

Rack 10 further includes top rail 60. This rail is also a channel shaped bar having the same width and length as rail 25. A rectangular hole 62 is formed at the center of the top flange 64. The cylindrical body of pin 44 is long enough to permit the rail 60 to rotate with the pin when key 46 is engaged in hole 42 as best shown in FIGS. 5 and 9. When rail 60 is rotated to a position perpendicular to rail 25 as shown in FIGS. 1 and 10, rail 60 can be moved along rail 25 parallel to the longitudinal direction of vehicle 15, while key 46 slides in slot 40. Key 46 is thinner than slot 40 so it slides freely. When the pin is located at hole 42, pin 44 and rail 60 can be rotated but they cannot slide along rail 25 because key 46 is stopped at slot 40 which is narrower than the key as shown in FIG. 9. A pair of hooks 64 are secured on top of rail 60 at opposite ends and these engage loops of strap 22. Vertical side flanges 63 of rail 60 rest on clamps 30 as shown in FIGS. 4 and 7.

The rear rack 12 is a flat or channel shaped bar formed with depending flanges 66,68 at opposite ends. A hook 70 secured to flange 66 engages the free edge 37 of roof 14. Flange 72 integral with flange 68 is detachably secured by nuts 73 to bolts 74 extending upwardly from bracket 73 which has hook 76 engaged with edge 39 of the roof. Hooks 80 secured on top of rack 12 at opposite ends thereof engage loops of strap 24.

In loading boat 20 on to the vehicle, the bow end is first placed on rail 60 which is moved up to one end of slot 40 near one edge of the roof. Rail 60 is then perpendicular to rail 25 as shown in FIG. 1. Strap 22 is engaged on the bow end of the boat. Then the boat and rail 60 are moved longitudinally as indicated by arrow A until pin 44 is centered at hole 42. Then the boat, rail and pin are rotated as indicated by arrow B. Since the boat rests on rail 60 this step is easily done. A shown in the drawing, one person alone can perform the loading operation. The stern end of the boat is then placed on stationary rack 12 in the position shown in FIG. 2 and strap 24 is engaged over the boat and secured to hooks 80. Unloading of the boat is performed by reversing the procedure described.

It will be apparent that the boat cannot move transversely of the roof top on either rack 10 or rack 12. At rack 10, the key 46 of pin 44 is stopped by the narrower slot 40 from moving along the slot. The boat can be loaded at either side of the vehicle since slot 40 extends almost the full length of rail 60 with hole 62 centered in rail 60.

The assembly of racks 10 and 12 supports the boat securely so that it can be carried safely by the vehicle. When the boat is removed, the rack assembly can be used for carrying other bulky articles such as a wall board, ladders, planks and the like.

What is claimed is:

1. A loader and carrier for an elongated bulky article on the roof of a vehicle, comprising a rack having first and second rails; means for attaching the first rail in a fixed horizontal, transverse position on the roof of the vehicle near one end of the roof, said first rail having a slot extending longitudinally thereof and terminating near opposite ends of the first rail, with a hole formed in the first rail at the center of the slot; a pin interposed between the first and second rail and holding them together, said pin having a key slidable along said slot so that the second rail is slidable with the pin when disposed perpendicularly to the first rail in a horizontal plane, and so that the second rail is rotatable with the pin when the key is located at said hole in the first rail to position the second rail parallel to the first rail.

2. A loader and carrier as defined in claim 1, further comprising another rack; and means for securing the other rack in fixed horizontal transverse position on the roof of the vehicle near the other end of the roof, whereby both racks cooperate in supporting said article on the roof of the vehicle.

3. A loader and carrier as defined in claim 2, further comprising straps engaged on the respective racks for holding said article on the racks.

4. A loader and carrier as defined in claim 1, wherein said first rail is a channel bar with a flat top flange horizontally disposed, said slot being formed in said flange, and wherein said second rail is another channel bar with another flat top flange, said pin being secured to said other flat top flange.

5. A loader and carrier as defined in claim 4, wherein said pin has a noncircular head extending axially away from said key, and wherein said other flange of the second rail has a centrally located noncircular hole receiving the head of the pin; and a bolt extending through the pin and engaged by a nut to hold the two rails together.

6. A loader and carrier as defined in claim 5, further comprising another rack; and means for securing the other rack in fixed horizontal transverse position on the roof of the vehicle near the other end of the roof, whereby both racks cooperate in supporting said article on the roof of the vehicle.

7. A loader and carrier as defined in claim 6, further comprising straps engaged on the respective racks for holding said article on the racks.

8. A loader and carrier as defined in claim 5, wherein the first named means for securing the first rail to the roof comprises a pair of clamps adjustably positionable along the first rail, and turnbuckles attached to the claims respectively and terminating in hooks engageable at opposite lateral edges of the roof, said second rail resting on said claims when disposed parallel to the first rail.

9. A loader and carrier as defined in claim 8, further comprising suction cups secured to the clamps and mountable on the roof of the vehicle to cooperate with the turnbuckles and hooks in holding the first rack in place on the vehicle.

10. A loader and carrier as defined in claim 1, wherein the first named means for securing the first rail to the roof comprises a pair of clamps adjustably positionable along the first rail, and turnbuckles attached to the claims respectively and terminating in hooks engageable at opposite lateral edges of the roof, said second rail resting on said claims when disposed parallel to the first rail.